UNITED STATES PATENT OFFICE 2,467,189

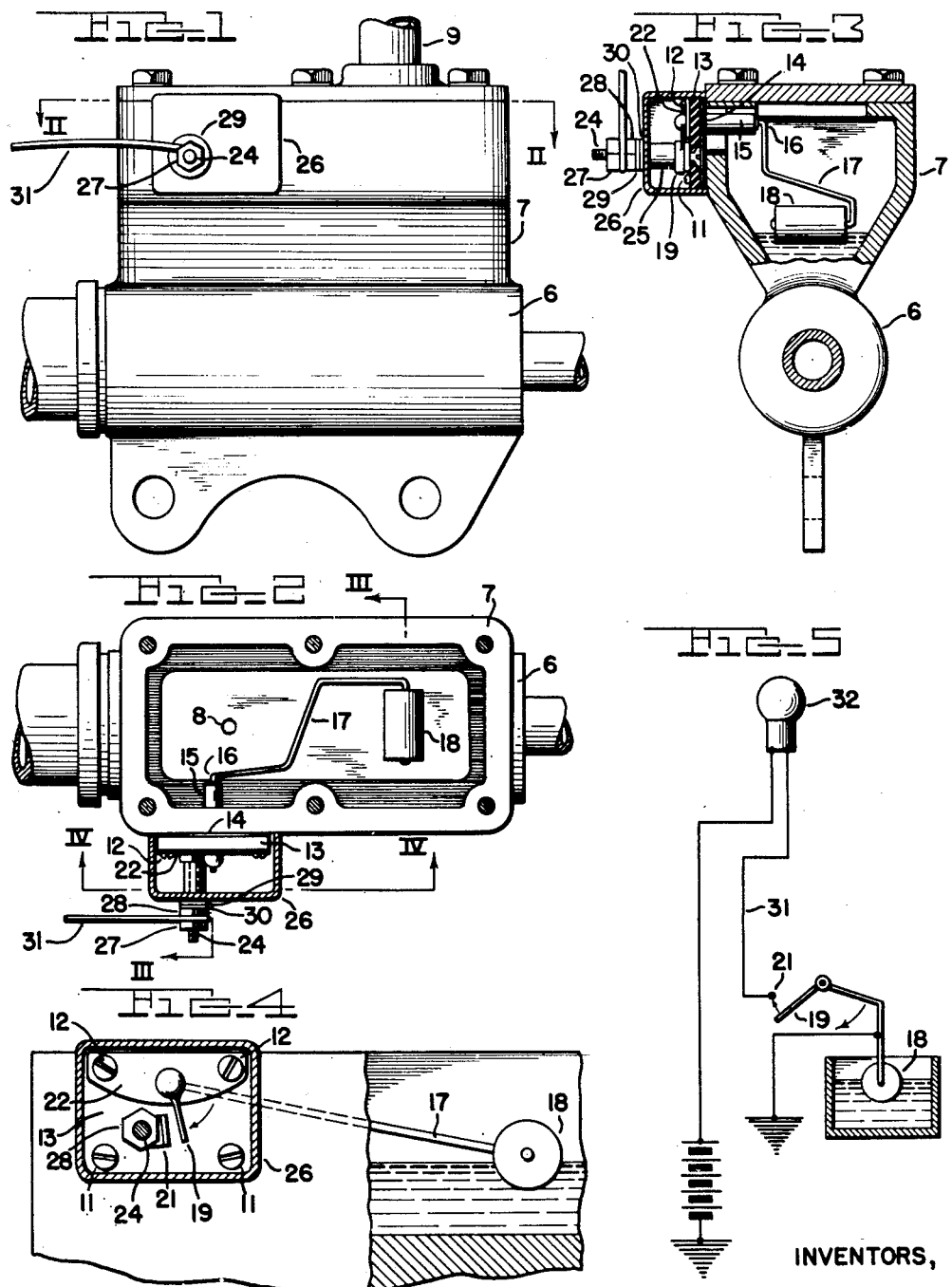

FLOAT OPERATED SWITCH

Milton Cohen and Henry Hawkins, Pittsburgh, Pa.

Application March 3, 1947, Serial No. 731,934

1 Claim. (Cl. 200—84)

This invention is particularly adapted to use on motor vehicles wherein hydraulic brakes are used, and which are equipped with a master brake cylinder wherein pressure is developed to operate the brakes. Such cylinders are commonly equipped with a reservoir that contains a reserve supply of brake fluid that is automatically supplied to the cylinder as required.

In devices of this character, trouble has frequently been experienced in that the reserve supply of braking fluid becomes exhausted and the braking operations become inefficient or ineffective, before the driver becomes aware of the need for additional brake fluid in the system.

One object of my invention is to provide a signaling or warning device that will automatically apprise the driver when the reserve supply of brake fluid is nearly exhausted.

Another object of my invention is to provide a signaling device of the character referred to which can readily be applied to standard types of master brake cylinders and reservoirs.

In the accompanying drawing, Figure 1 is a side view of a brake cylinder and reservoir for use in an automobile braking system, equipped with my invention; Fig. 2 is a view taken on the line II—II of Fig. 1; Fig. 3 is a view taken on the line III—III of Fig. 2, but with the reservoir cover in place; Fig. 4 is a view taken on the line IV—IV of Fig. 2, and Fig. 5 is a diagrammatic view showing relation of the device to a signal lamp circuit.

The brake cylinder 6 and the reservoir 7, for the brake liquid may be of conventional form, except for the addition of a float switch to the reservoir. Replenishment of fluid in the braking system will be from the reservoir 7 through a hole 8 into the brake cylinder, as is common in devices of this type. Replenishment of the fluid in the reservoir is had through a filling pipe 9.

The outer side of the reservoir 7 is tapped to receive a pair of screws 11 and a pair of screws 12, that serve to hold a switch base in the form of an insulating block 13 of fiber or other suitable material in place against the reservoir. A sealing plate 14 of fibrous material or rubber is interposed between the block 13 and the reservoir wall, to prevent seepage of oil from the reservoir. A bushing 15 extends through the disc 14 and into the block 13, with a snug fit.

A shaft 16 is journaled in the bearing bushing 15 and has a crank-like extension 17 that carries a float 18. At its outer end, the shaft 16 carries a movable switch contact member 19, so that as the float rises and falls with changes in liquid level in the reservoir, the switch contact member 19 will be moved into and out of engagement with a stationary contact member 21. The contact member is grounded through a metal plate 22 and the screws 12 to the reservoir 7 which is, of course, in turn grounded to the frame of the vehicle to which the device is applied.

The stationary switch contact member 21 is carried by a stud 24 that is, in turn, carried by the insulating block 13. A bushing 25 of insulating material surrounds the stud 24 and extends through a protective plate and switch casing 26 that is held in place against the casing by nuts 27 and 28 which are threaded on the stud 24. An insulating washer 29 and a steel washer 30 are interposed between the nut 28 and the outer face of the protective casing 26.

A conductor 31 is held in place by the nuts 27—28 and through them and the stud 24 has electrical connection with the stationary contact member 21.

As shown schematically in Fig. 5, the switch 19 controls the circuit through a lamp 32 that may suitably be mounted upon the dash board of the automobile, so that when the oil supply in the reservoir 7 reaches a dangerously low level, the switch will automatically be closed, to warn the operator that an additional supply of brake fluid is required.

We claim as our invention:

An electrical signaling device comprising a switch base of insulating material adapted for connection to the outer side of a liquid reservoir, a bearing bushing carried by the base and extending therethrough, a shaft that extends through the bushing and is rotatably supported thereby, the inner end of the shaft being provided with an extension that is adapted to extend through an opening in the side wall of the reservoir and carries a float, a switch contact member on the outer end of the shaft and at the outer side of the base, a conductor plate on the outer side of the base and having electrical contact with the switch member, screws extending through the plate and the base, for connecting them to the reservoir and electrically connecting the plate to the reservoir, a stud carried by the base and extending outwardly therefrom, a switch casing through which the stud extends, a switch contact member on the stud, within the casing, a nut on the outer end of the stud, in position to hold the casing in protective relation to the contact members, and a conductor held in place on the stud by the nut, the first-named contact member being movable into and out of engagement with the outer contact member, to make and break the electrical circuit, through vertical movements of the float.

MILTON COHEN.
HENRY HAWKINS.

REFERENCES CITED

The following references are of record in the file of this patent:

UNITED STATES PATENTS

| Number | Name | Date |
|---|---|---|
| 566,612 | Connor et al. | Aug. 25, 1896 |
| 712,630 | Zimmermann | Nov. 4, 1902 |
| 2,239,071 | Zeller | Apr. 22, 1941 |
| 2,253,260 | Alcorn | Aug. 19, 1941 |

FOREIGN PATENTS

| Number | Country | Date |
|---|---|---|
| 159,761 | Great Britain | Mar. 10, 1921 |